US009482021B2

(12) United States Patent
Smith et al.

(10) Patent No.: US 9,482,021 B2
(45) Date of Patent: Nov. 1, 2016

(54) SLIDE AND LOWER MODULAR ENCLOSURE TRANSFER SYSTEM

(71) Applicant: NORTHERN STAR INDUSTRIES, INC., Iron Mountain, MI (US)

(72) Inventors: Larry Smith, Iron Mountain, MI (US); Andy Thom, Kingsford, MI (US); Jon Walimaa, Kingsford, MI (US); Erik Peterson, Crystal Falls, MI (US); Andrew Janczy, Armstrong Creek, WI (US); Dave Brule, Sr., Channing, MI (US)

(73) Assignee: NORTHERN STAR INDUSTRIES, INC., Iron Mountain, MI (US)

( * ) Notice: Subject to any disclaimer, the term of this patent is extended or adjusted under 35 U.S.C. 154(b) by 109 days.

(21) Appl. No.: 14/537,228

(22) Filed: Nov. 10, 2014

(65) Prior Publication Data

US 2015/0167331 A1 Jun. 18, 2015

Related U.S. Application Data

(60) Provisional application No. 61/917,741, filed on Dec. 18, 2013.

(51) Int. Cl.
*B60P 1/02* (2006.01)
*E04G 23/00* (2006.01)
*E04G 23/06* (2006.01)
*E04G 21/16* (2006.01)
(Continued)

(52) U.S. Cl.
CPC ............ *E04G 21/161* (2013.01); *B66D 3/006* (2013.01); *B66F 3/46* (2013.01)

(58) Field of Classification Search
CPC ..... E04G 21/161; E04G 23/06; E04G 21/14; B60P 1/6436; B60P 3/00; B65D 90/143; B66F 1/08; E04B 1/348
USPC .......... 104/31; 137/884; 193/41; 248/188.2, 248/188.3, 188.5; 254/105, 423; 280/763.1, 280/766.1; 414/10, 11, 12, 458, 495, 498, 414/542; 52/745.02, 749.1
See application file for complete search history.

(56) References Cited

U.S. PATENT DOCUMENTS 295,921 A * 4/1884 Hollingsworth ........ E04G 23/06 238/13
689,363 A * 12/1901 McDonner ............. E04G 23/06 193/38
3,033,525 A * 5/1962 Johnson ................. B66F 1/025 104/162
(Continued)

*Primary Examiner* — Gregory Adams
(74) *Attorney, Agent, or Firm* — Marshall, Gerstein & Borun LLP

(57) ABSTRACT

A non-crane system for moving a pre-fabricated enclosure is disclosed. The system comprises a sliding beam system and a system of coordinated self-contained hydraulic jack units, which in conjunction allow a pre-fabricated enclosure to be slid horizontally off a semi-trailer, positioned above a pre-laid foundation, and lowered to the foundation. Slide beams are arranged perpendicularly to the semi-trailer and supported by blocks at the height of the pre-fabricated enclosure. A cable attachment plate located on each slide beam connects to the pre-fabricated enclosure and is connected by a cable to winches placed at the end of each slide beam. The rotation of the winches pulls the pre-fabricated enclosure off the semi-trailer and onto the sliding beam system. The system of coordinated self-contained hydraulic jack units, which comprises multiple portable self-contained hydraulic jack units, then lowers the pre-fabricated enclosure to the foundation.

9 Claims, 10 Drawing Sheets

(51) Int. Cl.
*B66D 3/00* (2006.01)
*B66F 3/46* (2006.01)

(56) References Cited

U.S. PATENT DOCUMENTS

| | | | | | |
|---|---|---|---|---|---|
| 3,231,121 | A * | 1/1966 | Powell | E04G 21/161 | 280/789 |
| 3,236,400 | A * | 2/1966 | Turturro | B60P 3/00 | 414/12 |
| 3,289,382 | A * | 12/1966 | Van Der Lely | E04B 1/348 | 254/281 |
| 3,587,890 | A * | 6/1971 | Hyland et al. | E04G 21/161 | 238/13 |
| 3,679,177 | A * | 7/1972 | Scholz | E04G 21/161 | 254/89 R |
| 3,743,120 | A * | 7/1973 | Schmidt | E04G 21/161 | 238/13 |
| 3,789,558 | A * | 2/1974 | Spencer | E04G 21/14 | 254/92 |
| 3,874,639 | A * | 4/1975 | Wilson | B60S 9/00 | 238/13 |
| 3,879,050 | A * | 4/1975 | Young | E04B 1/34352 | 280/639 |
| 3,887,204 | A * | 6/1975 | Austin | B62B 3/06 | 180/200 |
| 3,958,705 | A * | 5/1976 | Baxter | E02D 27/00 | 414/12 |
| 3,985,237 | A * | 10/1976 | Freudlsperger | E04G 21/161 | 414/12 |
| 4,006,574 | A * | 2/1977 | van der Lely | E04G 21/161 | 52/169.1 |
| 4,030,699 | A * | 6/1977 | Heimke | B66F 1/08 | 254/108 |
| 4,147,267 | A * | 4/1979 | Mai | B60P 1/64 | 254/45 |
| 4,198,797 | A * | 4/1980 | Soble | E04B 1/348 | 254/84 |
| 4,352,628 | A * | 10/1982 | Rogers, Jr. | B66F 3/46 | 414/12 |
| 4,611,816 | A * | 9/1986 | Traister | B65D 90/143 | 280/43.2 |
| 4,923,174 | A * | 5/1990 | Loechner | B66F 1/08 | 254/105 |
| 5,911,179 | A * | 6/1999 | Spiczka | B65D 19/0095 | 108/51.11 |
| 6,027,295 | A * | 2/2000 | Geppert | B66F 1/00 | 104/128 |
| 6,846,144 | B2 * | 1/2005 | Justice | E04G 23/06 | 414/12 |
| 8,201,805 | B1 * | 6/2012 | Cid | B66F 3/24 | 254/2 C |
| 2011/0016694 | A1 * | 1/2011 | Gilgan | E04B 1/35 | 29/430 |
| 2012/0151854 | A1 * | 6/2012 | Scott, IV | E04H 9/14 | 52/143 |
| 2013/0140802 | A1 * | 6/2013 | Warr | B60S 9/10 | 280/766.1 |

* cited by examiner

SLIDE AND LOWER MODULAR ENCLOSURE TRANSFER SYSTEM

CROSS-REFERENCE TO RELATED APPLICATIONS

This is a non-provisional and claims the benefit of the filing date of U.S. Provisional Appl. No. 61/917,741 filed Dec. 18, 2013. U.S. Provisional Appl. No. 61/917,741 is hereby incorporated by reference.

FIELD OF THE DISCLOSURE

This disclosure relates generally to a system for moving a pre-fabricated enclosure, and more specifically, to a non-crane system for moving a pre-fabricated enclosure employing a sliding beam system and a system of coordinated self-contained hydraulic jack units.

BACKGROUND

Pre-fabricated metal enclosures used, for example, at electrical sub-stations are typically unloaded from a semi-trailer using a large mobile crane system. The crane normally attaches to the base of the pre-fabricated enclosure, lifts the pre-fabricated enclosure from the truck, and places it on a pre-laid foundation. The crane system is sometimes not practical for transferring the pre-fabricated enclosure at a job site due to high voltage overhead power lines, strong winds, or other environmental factors, conditions, or interferences. Additionally, the pre-laid foundation is intended to be level before the pre-fabricated enclosure is placed on it. However, the swinging of the pre-fabricated enclosure as it is lowered by the crane makes it difficult to make adjustments to correct for any out-of-level conditions. Further, the unloading and placement of a pre-fabricated enclosure by a crane system is time consuming, generally taking between two and eight hours.

SUMMARY OF THE DISCLOSURE

A "slide and lower" modular enclosure transfer system is provided comprising a sliding beam system and a system of coordinated self-contained hydraulic jack units. The sliding beam system pulls a pre-fabricated metal enclosure off a semi-trailer using winches and slide beams, and then the system of coordinated self-contained hydraulic jack units lowers the pre-fabricated enclosure to a pre-laid foundation. Prior to the placement of the pre-fabricated enclosure, a foundation is poured at a job site and an initial check to verify the foundation is level is completed using a laser-level system or another method. The foundation may take the form of a concrete slab or a plurality of concrete piers. To transport the pre-fabricated enclosure to the job site for placement, the pre-fabricated enclosure is initially placed on a flatbed semi-trailer having flat ribs or a resting surface on which the base of the enclosure, which is comprised of a frame formed by C-channels, rests. The pre-fabricated enclosure may be wider than the semi-trailer, and the edges of the pre-fabricated enclosure may consequently extend beyond the edges of the semi-trailer. At the job site, the semi-trailer is parked adjacent to the pre-laid foundation in a position in which the pre-fabricated enclosure can be pulled substantially sideways off the semi-trailer and positioned directly above the foundation.

Prior to moving the pre-fabricated enclosure, each of the self-contained hydraulic jack units, which may be transported separately from the pre-fabricated enclosure, is secured to the pre-fabricated enclosure. The system of coordinated self-contained hydraulic jack units comprises at least four self-contained hydraulic jack units. The self-contained hydraulic jack units are preferably connected to a multi-jack unit controller that can adjust the height of each self-contained hydraulic jack unit collectively in concert with the other self-contained hydraulic jack units. Alternately, each self-contained hydraulic jack unit can be adjusted independently using an independent controller associated solely with that self-contained hydraulic jack unit. Each self-contained hydraulic jack unit comprises wheels for moving the self-contained hydraulic jack unit when it is not attached to the enclosure, a base for lifting the self-contained hydraulic jack unit to the level of the pre-fabricated enclosure and later for supporting the pre-fabricated enclosure, a connecting plate for attaching to the pre-fabricated enclosure, a cylinder for lowering and/or raising the pre-fabricated enclosure, a power unit containing a battery for controlling and powering the self-contained hydraulic jack unit, and a counterbalanced hydraulic valve system to prevent unwanted cylinder retraction. Each self-contained hydraulic jack unit is adapted to move between an upright position in which the self-contained hydraulic jack unit rests upon the base and a tipped position in which the self-contained hydraulic jack unit rests upon the wheels.

To connect the self-contained hydraulic jack units to the pre-fabricated enclosure, each self-contained hydraulic jack unit is wheeled in the tipped position to semi-trailer. The base of each self-contained hydraulic jack unit is placed on the ground or on a wooden block next to the semi-trailer. Each self-contained hydraulic jack unit is then rotated on its base into an upright position. Once in the upright position, the connecting plate of each self-contained hydraulic jack unit is inserted between the two flanges of the C-channel at the base of the pre-fabricated enclosure so that it can be bolted or otherwise fastened to the vertical web of the C-channel. The connecting plate secures each self-contained hydraulic jack unit to the pre-fabricated enclosure.

The pre-fabricated enclosure is moved off the semi-trailer using a sliding beam system. Slide beams, which are I-beams with a low friction pad on the upper surface of the upper flange of each I-beam, are arranged perpendicularly to the semi-trailer. The low friction pad may be made of high density polyethylene, for example, and a further lubricant, such as dish detergent, may be applied to the top of the low friction pad. Wooden blocks placed below the slide beams support the slide beams such that the slide beams are level to the pre-laid foundation and the low-friction pads are the same height as the flat ribs or resting surface of the semi-trailer. Each slide beam may comprise a tongue that extends beyond the end of the slide beam and rests on the trailer, and a strap may further be used to secure the end of the slide beam to the semi-trailer. The slide beams should be placed, at a minimum, every twelve feet along the length of the enclosure. In one embodiment of the sliding beam system for an eighteen foot enclosure, a slide beam is placed every nine feet along the length of the enclosure for a total of three slide beams. A cable attachment plate located on each slide beam connects the pre-fabricated enclosure to the sliding beam system. The cable attachment plate has a top plate that rests on the low friction pad on the upper flange of the slide beam and parallel side plates that extend downward from the top plate on either side of the slide beam to secure the cable attachment plate to the slide beam in a manner that will still enable the cable attachment plate to slide along the slide beam. One end of the cable attachment plate extends underneath the enclosure and hooks extending upward from this end of the top plate engage the C-channels at the base of the pre-fabricated enclosure. On the end of the cable attachment plate that does not extend underneath the enclosure, the top plate is connected to a pulley which is connected to a cable. The cable is connected to a winch placed at the end of each slide beam that is opposite the still-loaded position of the pre-fabricated enclosure. Blankets are hung over the cables and slide beams to contain cable fragments in the event of a cable failure. The winches are powered by a portable generator.

When an operator turns on the generator and beings rotating the winches, the cables cause the cable attachment plates on each slide beam to slide along each slide beam in the direction of the winch, and the hooks on the cable attachment plates thereby pull the pre-fabricated enclosure off the semi-trailer. The pre-fabricated enclosure is pulled along the slide beams until it is properly positioned over the pre-laid foundation. The multi-jack unit controller may then be used to lower the bases of the self-contained hydraulic jack units the ground and to raise the pre-fabricated enclosure slightly. Once the self-contained hydraulic jack units are supporting the pre-fabricated enclosure, the sliding beam system may be disassembled and removed.

The "slide and lower" modular enclosure transfer system may optionally additionally include slide beam removal devices. After the pre-fabricated enclosure has been properly positioned on the slide beams over the pre-laid foundation and the hydraulic jack units have raised the pre-fabricated enclosure, the winches, cables, and cable attachment plates should be removed. The slide beam removal devices may then be clamped onto an C-channel at the base of the building above a slide beam. The slide beam removal devices comprise rollers that engage the bottom side of the upper flange of each slide beam on either side of the web of the slide beam for the rolling removal of the slide beam from underneath the pre-fabricated enclosure.

Once the sliding beam system has been completely removed, the pre-fabricated enclosure can lowered using the multi-jack unit controller simultaneously by all of the self-contained hydraulic jack units onto the pre-laid foundation in a single step. Alternately, the self-contained hydraulic jack units may be operated independently using independent controllers and/or the pre-fabricated enclosure may be lowered in a series of steps. For example, the pre-fabricated enclosure may be partially lowered, the pre-laid foundation may undergo a secondary check to ensure that it is level and be adjusted by shimming as necessary, and then the pre-fabricated enclosure may be lowered the remaining distance on to the pre-laid foundation.

DETAILED DESCRIPTION OF THE PREFERRED EMBODIMENTS

Figure 1:
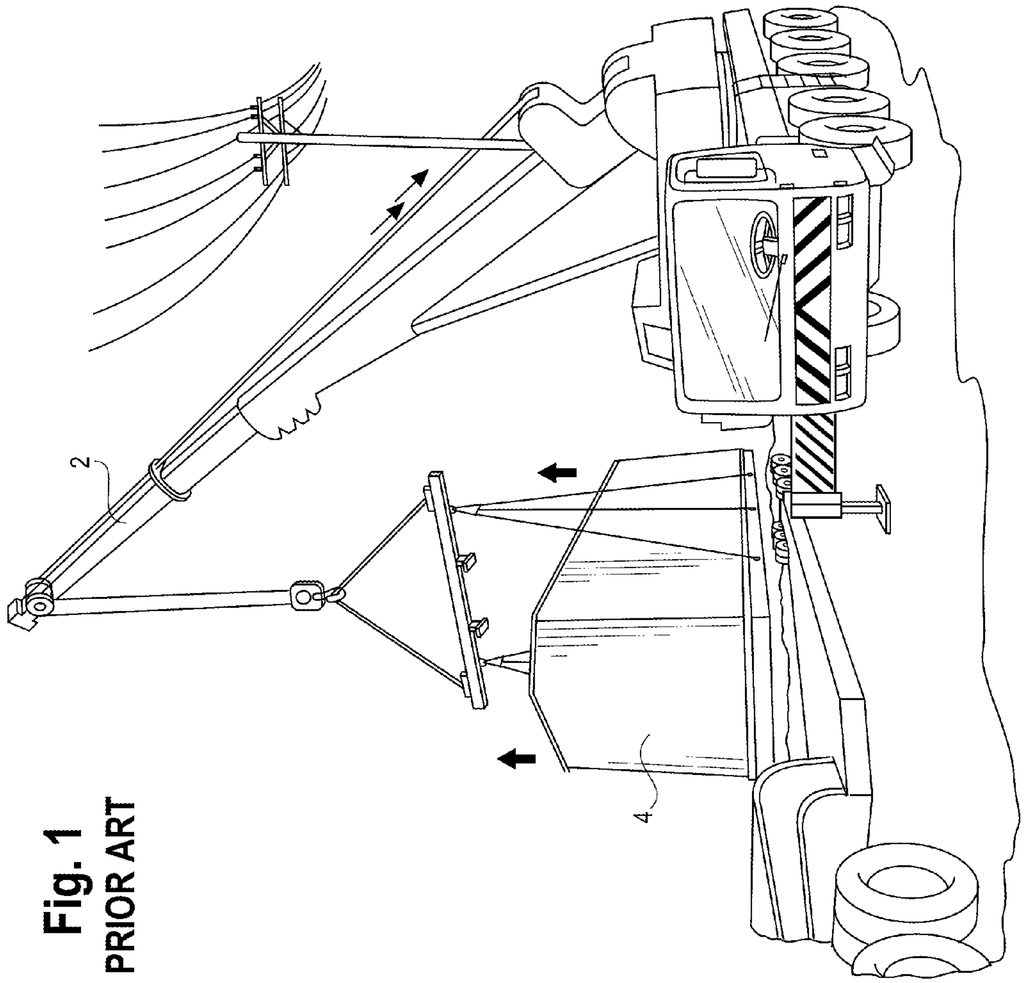
Fig. 1 PRIOR ART
FIG. 1 illustrates an example of the crane systems currently employed to move pre-fabricated enclosures and the disadvantages associated with such crane systems.

FIG. 1 illustrates an example of the crane systems 2 currently employed to move pre-fabricated enclosures 4 and the disadvantages associated with such crane systems 2. Crane systems 2 are not optimal for moving pre-fabricated enclosures 4 for a number of reasons. The placement of a pre-fabricated enclosure 4 by a crane system 2 is time consuming. The placement of a pre-fabricated enclosure 4 typically takes between two and eight hours. In contrast, a pre-fabricated enclosure 4 can be placed by the system presently disclosed within two hours. Crane systems 2 pose a safety risk at job sites having high voltage overhead power lines. The crane may come into contact with the overhead power lines, potentially damaging or breaking the overhead power lines and creating an electrical risk for workers on the job site. In certain circumstances, the presence of overhead power lines may prevent an otherwise desirable location for a pre-fabricated enclosure 4 from being used because the pre-fabricated enclosure 4 cannot be placed without interference with the overhead power lines using a crane system 2. Crane systems 2 are also not optimal for moving pre-fabricated enclosures during inclement weather. Strong winds sufficient to cause a pre-fabricated enclosure 4 to sway in midair can delay or prevent the placement of a pre-fabricated enclosure 4. Finally, the pre-laid foundation at a job site occasionally needs to be adjusted to be level as the pre-fabricated enclosure 4 is placed. Correcting for any out-of-level conditions of the pre-laid foundation using a crane system 2 is difficult due to the sway of the pre-fabricated enclosure 4 while it is hanging from the crane system 2, particularly in windy conditions.

Figure 2:
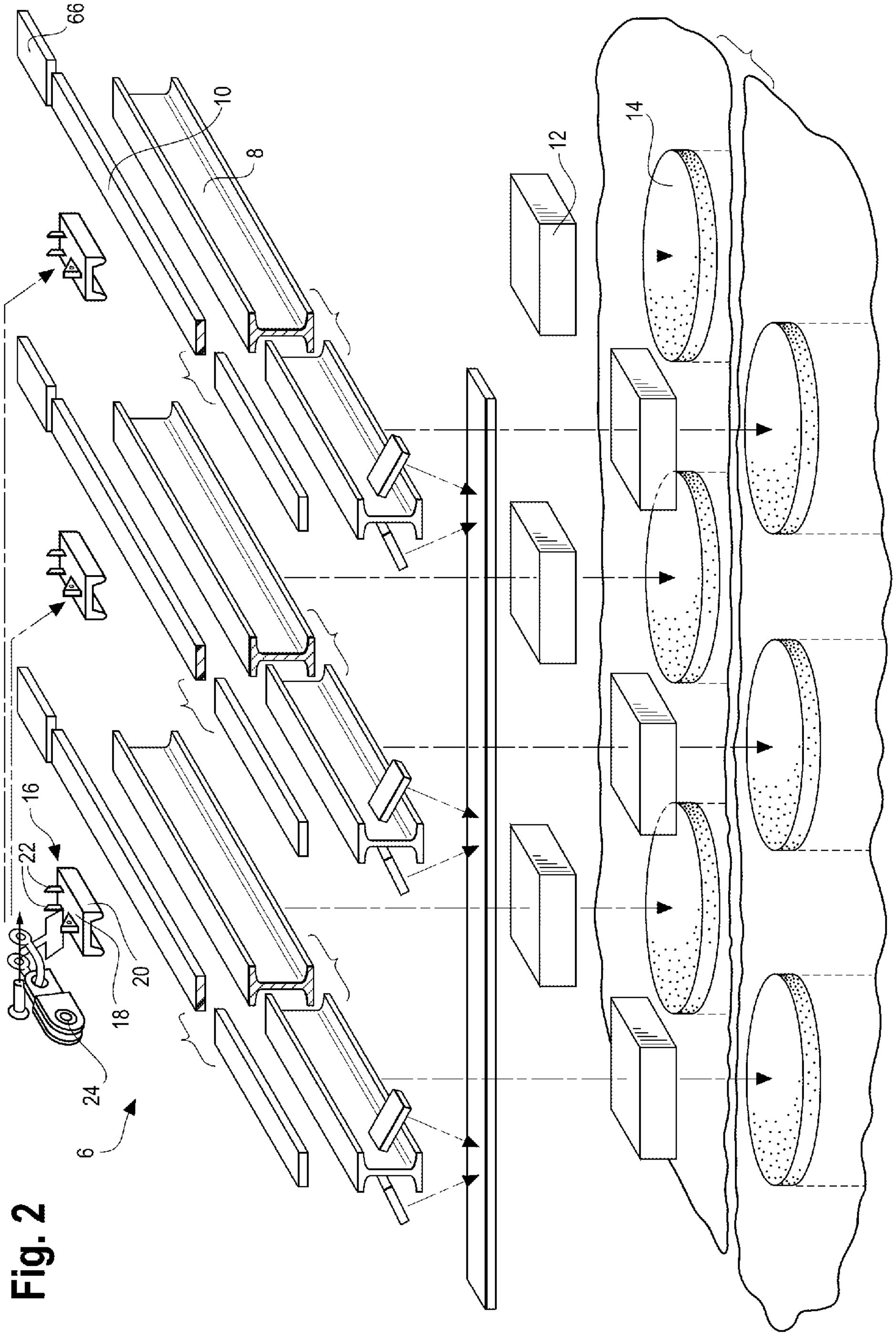
FIG. 2 illustrates an expanded isometric view of a sliding beam system.

FIG. 2 is an expanded isometric view of a sliding beam system 6 of the present disclosure. The sliding beam system 6 comprises slide beams 8, which are I-beams comprising a low friction pad 10 on the upper surface of the upper flange of each I-beam. The low friction pads 10 may be mad of high density polyethylene or another suitable material. A lubricant, such as a liquid soap substance, may be applied to the top of the low friction pads 10 in order to further facilitate the movement of the pre-fabricated enclosure. Blocks 12, made of wood or another suitable material, are placed underneath each slide beam 8 such that the slide beams 8 are raised but remain parallel to the foundation 14. Each slide beam 8 may comprise a tongue 66 that is welded or otherwise secured to the slide beam and extends beyond the end of the slide beam. The tongue 66 of each slide beam 8 is placed upon the bed of the semi-trailer. A strap or other mode of connection may further be used to secure the end of the slide beam 8 to the semi-trailer. The pre-fabricated enclosure is attached to the sliding beam system 6 by a cable attachment plate 16. The cable attachment plate 16 comprises a top plate 18, side plates 20, hooks 22, and a pulley 24. The top plate 18 of the cable attachment plate 16 rests on top of the low friction pad 10 on the top surface of the upper flange of a slide beam 8. The side plates 20 are parallel and extend downward from the top plate 18 of the cable attachment plate 16. The distance between the side plates 20 is equal to the width of the slide beam 8, such that the side plates 20 secure the cable attachment plate 16 in a slidable manner onto the slide beam 8. One or more hooks 22 extend upward from one end of the top plate 18. At the other end of the top plate 18, a pulley 24 extends upward.

Figure 3:
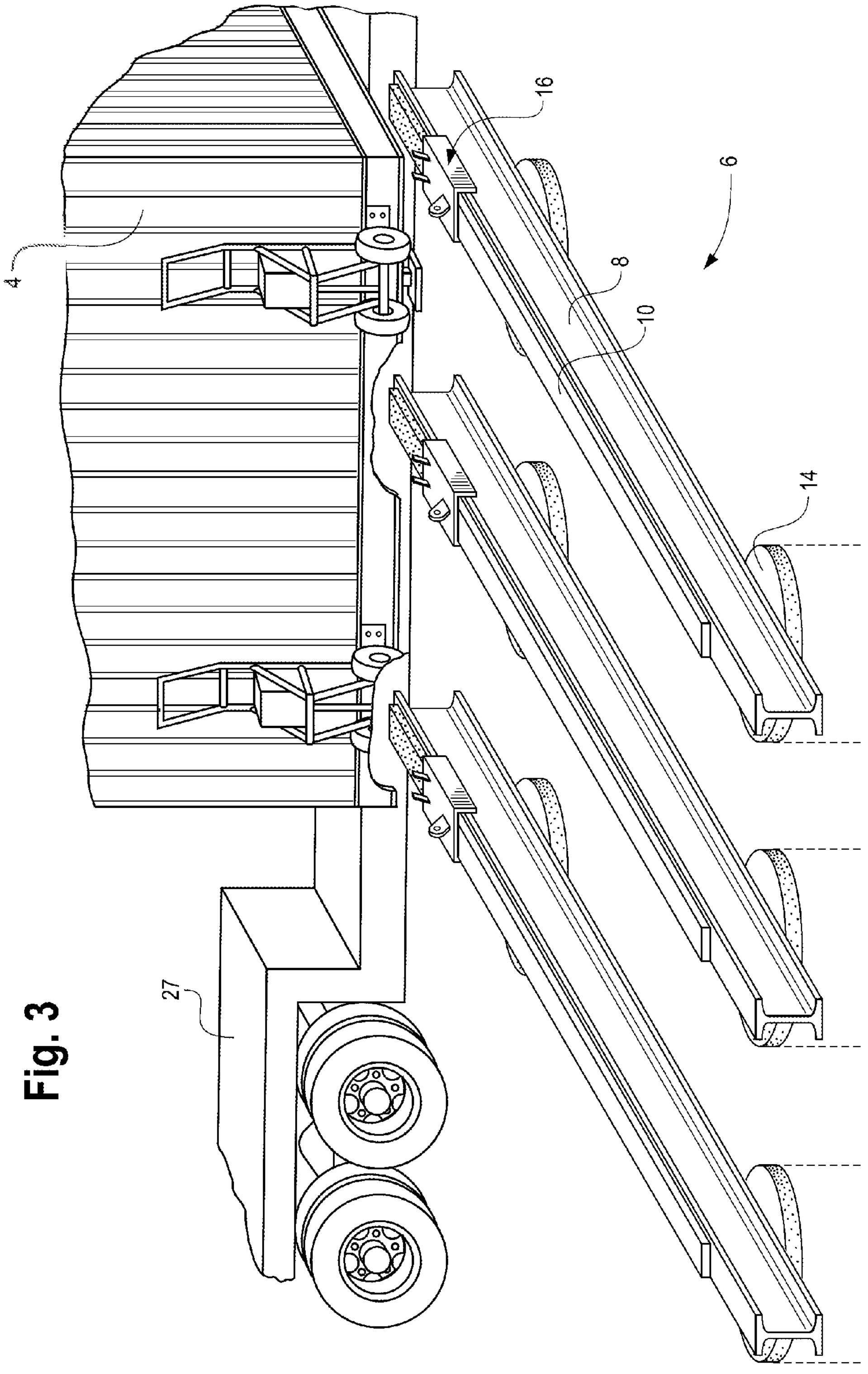
FIG. 3 illustrates an isometric view of the sliding beam system as it is initially being assembled.

FIG. 3 is an isometric view of the sliding beam system 6 as it is initially being assembled. Prior to the assembly of the sliding beam system 6, a foundation 14 has been laid at the job site. Generally, the foundation will comprised of concrete piers that are three to four feet deep. Alternately, the foundation may be a concrete slab or have another suitable configuration. A semi-trailer 27, or another capable vehicle, carrying the pre-fabricated enclosure 4 has been parked adjacent to the foundation 14. The semi-trailer 27 may have ribs extending slightly above the surface of the flat bed of the semi-trailer 27 upon which the pre-fabricated enclosure 4 is situated, or the pre-fabricated enclosure 4 may be rest upon a resting surface of the semi-trailer 27. Slide beams 8 are placed perpendicular to the pre-fabricated enclosure 4 at least every twelve feet for the length of the pre-fabricated enclosure 4 but may be placed more frequently. The top of the tongue (not pictured) of each slide beam 8 should be no greater than, and preferably somewhat less than, the height of the top of any rib or resting surface. In one embodiment having a pre-fabricated enclosure 4 that is eighteen feet long, three slide beams 8 are placed every nine feet along the pre-fabricated enclosure 4. A cable attachment plate 16 is placed on top of each slide beam 8, and a lubricant may be applied to the low friction pad 10 of each slide beam 8.

Figure 4:
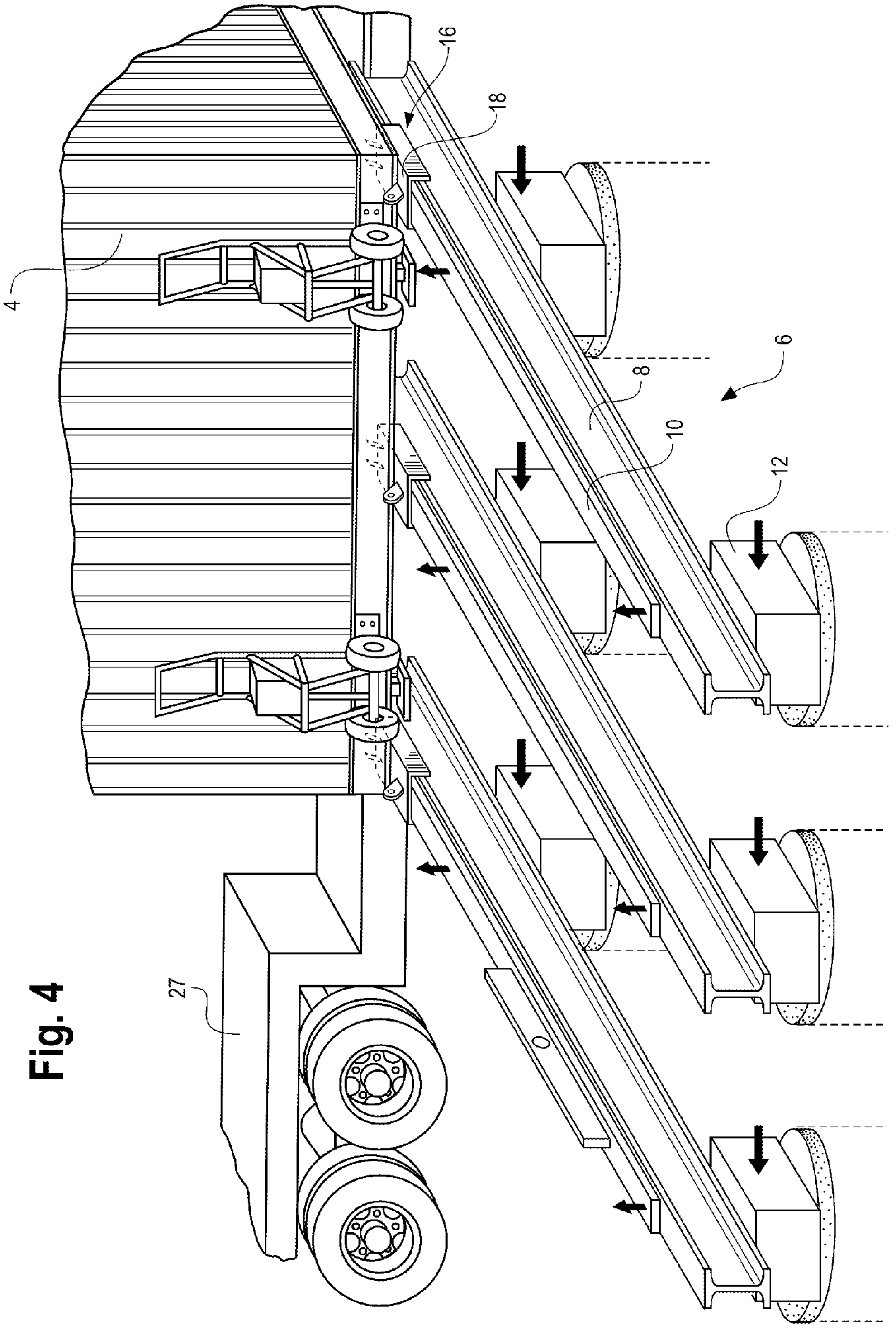
FIG. 4 illustrates an isometric view of the sliding beam system during its assembly as the sliding beams are raised to the level of the pre-fabricated enclosure.

FIG. 4 is an isometric view of the sliding beam system 6 during its assembly as the slide beams 8 are raised to the level of the pre-fabricated enclosure 4. Blocks 12 are placed below the slide beams 8 in order to raise the slide beams 8. The height of the low friction pads 10 on the slide beams 8 after blocks 12 are placed below the slide beams 8 should be the same height as the ribs or the resting surface upon which the pre-fabricated enclosure 4 is resting on the semi-trailer 27. Tongues (not pictured) of the slide beams 8 may rest upon the semi-trailer 27 to provide a firm base for the I-beam. Each cable attachment plate 16 is connected to the pre-fabricated enclosure 4 by placing a portion of the top plate 18 underneath the C-channel at the base of the pre-fabricated enclosure 4, which generally hangs over the edge of the semi-trailer 27, such that the hooks (not pictured) on the top plate 18 engage, or will engage upon movement of the pre-fabricated enclosure 4, the C-channel from inside the pre-fabricated enclosure 4.

Figure 5:
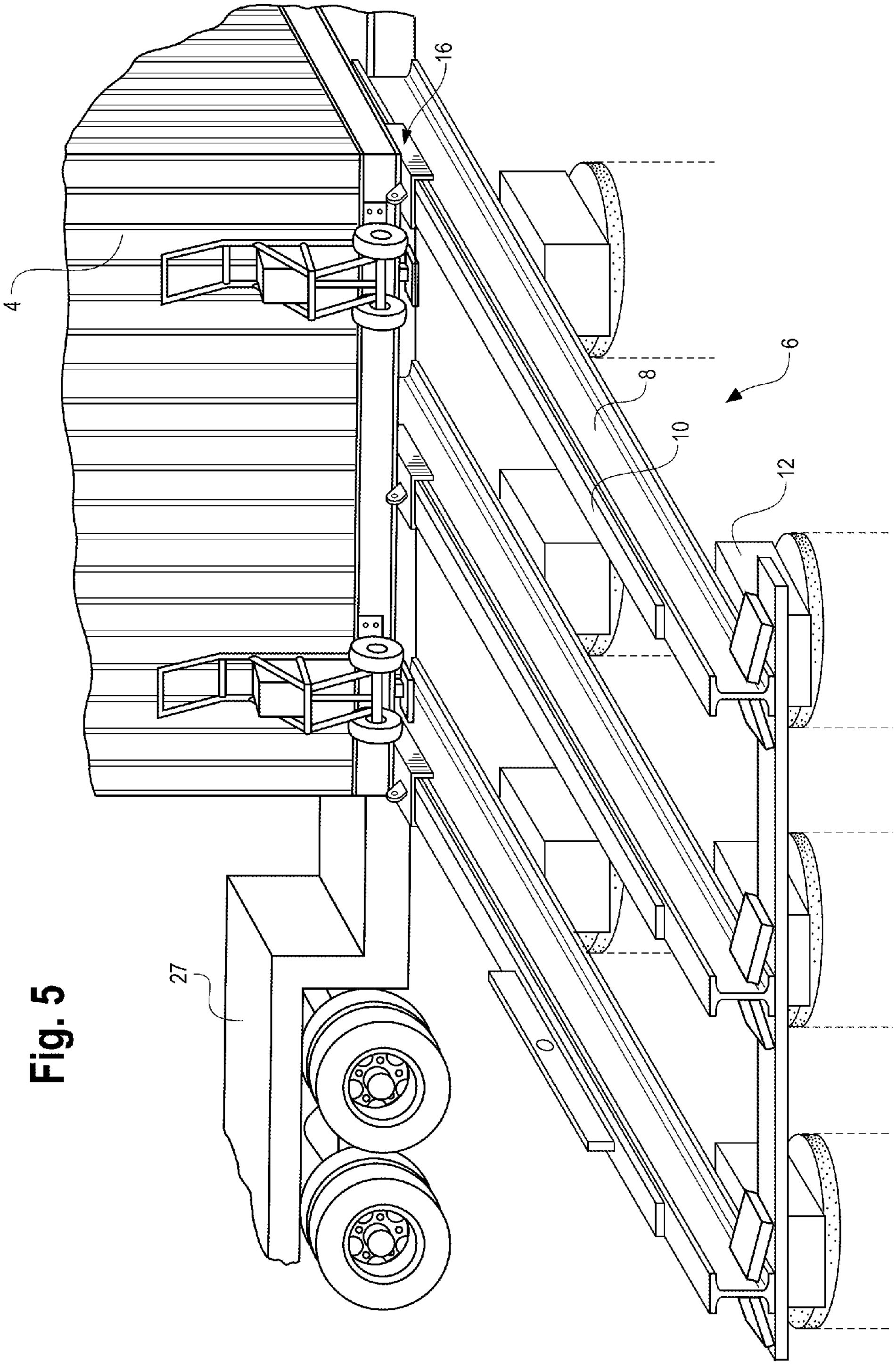
FIG. 5 illustrates an isometric view of the sliding beam system after it has been assembled.

FIG. 5 is an isometric view of the sliding beam system 6 after it has been assembled. The blocks 12 are supporting the slide beams 8. The low friction pads 10 are at the same height as the ribs or resting surface of the semi-trailer 27. The hooks of the cable attachment plates 16 are engaging, or will engage, the C-channel at the base of the pre-fabricated enclosure 4 when the pre-fabricated enclosure 4 is moved.

Figure 6:
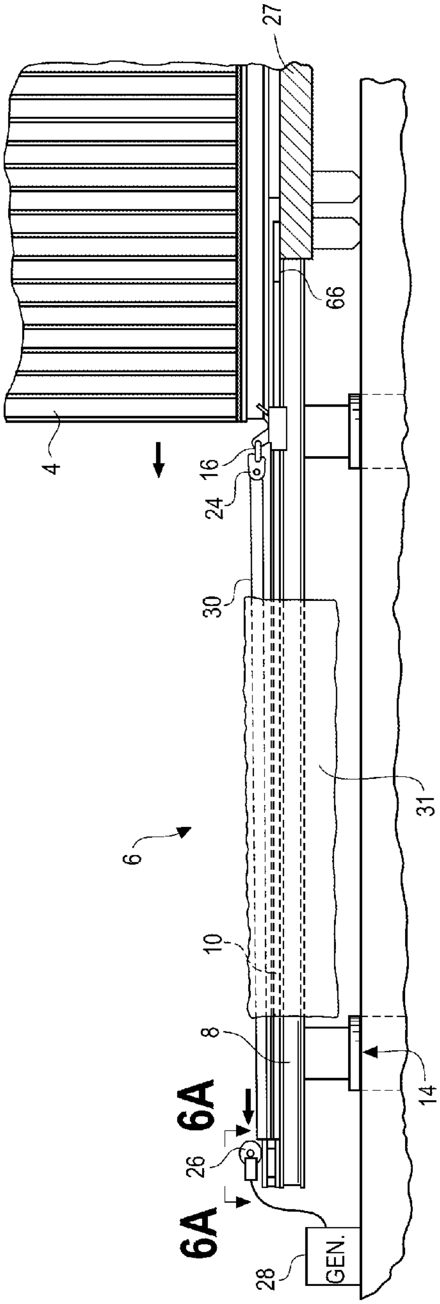
FIG. 6 illustrates a side view of the sliding beam system as the pre-fabricated enclosure is beginning to be moved across the sliding beam system to its desired location above the pre-laid foundation; Inset
Figure 7:
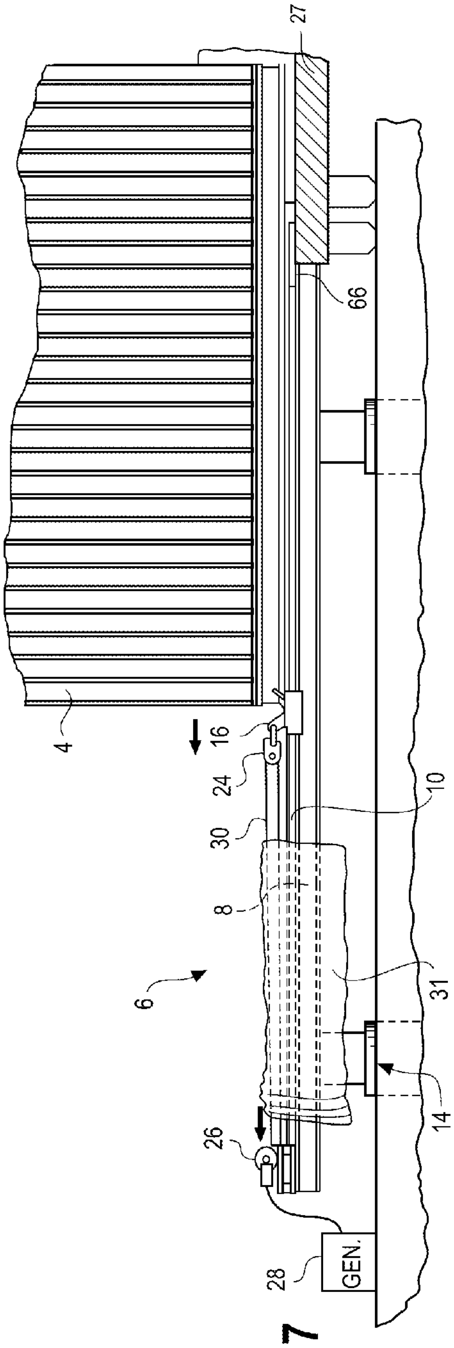
FIG. 7 illustrates a side view of the sliding beam system similar to FIG. 6, but with more of the pre-fabricated enclosure moved off of the semi-trailer.
Figure 6A:
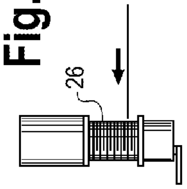
FIG. 6A illustrates a top view of the winch.

FIGS. 6 and 7 are side views of the sliding beam system 6 as the pre-fabricated enclosure 4 is moved across the sliding beam system 6 to its desired location above the pre-laid foundation 14. Inset FIG. 6A illustrates a top view of the winch 26. For each set comprising a cable attachment plate 16, cable 30, and winch 26, one end of a cable 30 attaches to the pulley 24 of the cable attachment plate 16. The other end of the cable 30 is connected to a winch 26 located at the end of the slide beam 8 that, in conjunction with the pulley 24, forms a block and tackle. All of the winches 26 located at the end of the slide beams 8 may be powered by a single generator 28. Alternately, multiple generators 28 may power the winches 26. A user turns on the generator 28 powering the winches 26 and begins to rotate the winches 26. The winches 26 pull the cables 30 through the pulleys 24 of the cable attachment plates 16. The cable attachment plates 16 are pulled toward the winches 26 at the end of the slide beams 8. The hooks (not pictured) on the cable attachment plates 16 in turn pull the pre-fabricated enclosure 4 off the ribs or resting surface of the semi-trailer 27, over the tongues 66 of the slide beams 8, and onto the low friction pads 10 of the slide beams 8. Blankets 31 may be draped over the cables 30 to reduce the likelihood of injury in the event that a cable 30 snaps.

Figure 8:
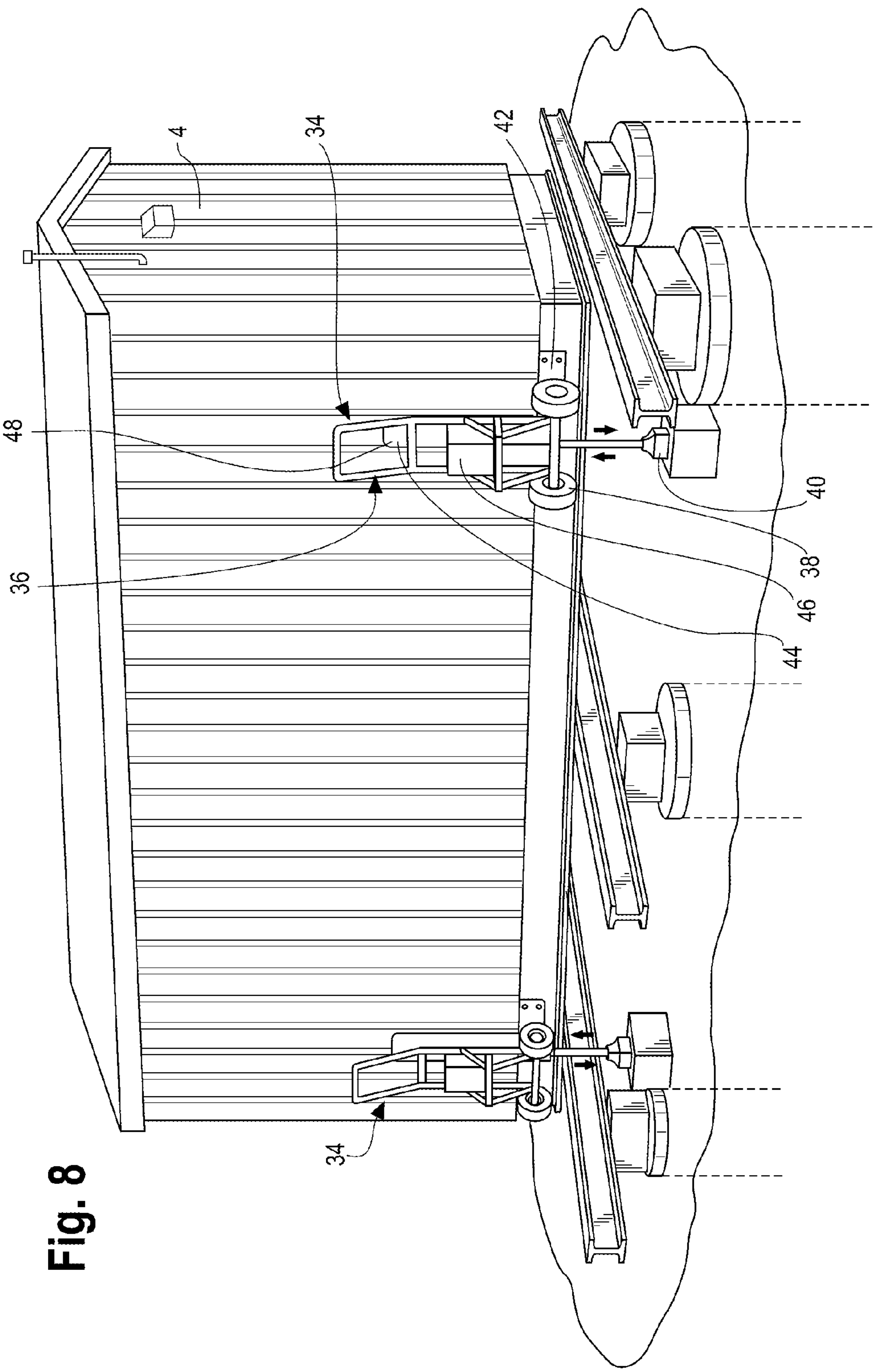
FIG. 8 illustrates an isometric view of the system of coordinated self-contained hydraulic jack units being attached to the pre-fabricated enclosure.

FIG. 8 is an isometric view of the system of coordinated self-contained hydraulic jack units 34 being attached to the pre-fabricated enclosure 4. The system of coordinated self-contained hydraulic jack units 34 comprises one or more self-contained hydraulic jack units 36 and a multi-jack unit controller (not pictured). Each self-contained hydraulic jack unit 36 comprises wheels 38, a base 40, a connecting plate 42, a cylinder 44, a power unit 46 comprising a battery, and a counterbalanced hydraulic valve system 48, and an independent controller (not pictured). Each self-contained hydraulic jack unit is adapted to move between an upright position in which the self-contained hydraulic jack unit 36 rests upon the base 40 and a tipped position in which the self-contained hydraulic jack unit 36 rests upon the wheels 38. Each self-contained hydraulic jack unit 36 is wheeled upon its wheels 38 in a tipped position to the pre-fabricated enclosure 4. The base 40 may then be placed upon a block, which may be made of wood, or may simply be placed on the ground. The self-contained hydraulic jack unit 36 is pivoted into its upright position. Once in an upright position, the height of the self-contained hydraulic jack unit 36 may be adjusted by the cylinder 44 until the connecting plate 42 of the self-contained hydraulic jack unit 36 is at the proper height to be connected to the pre-fabricated enclosure 4. In some embodiments, the connecting plate 42 is dimensioned to fit between the flanges of the C-channel at the base of the pre-fabricated enclosure 4 and be fastened into the web of the C-channel at the base of the pre-fabricated enclosure 4.

Figure 9:
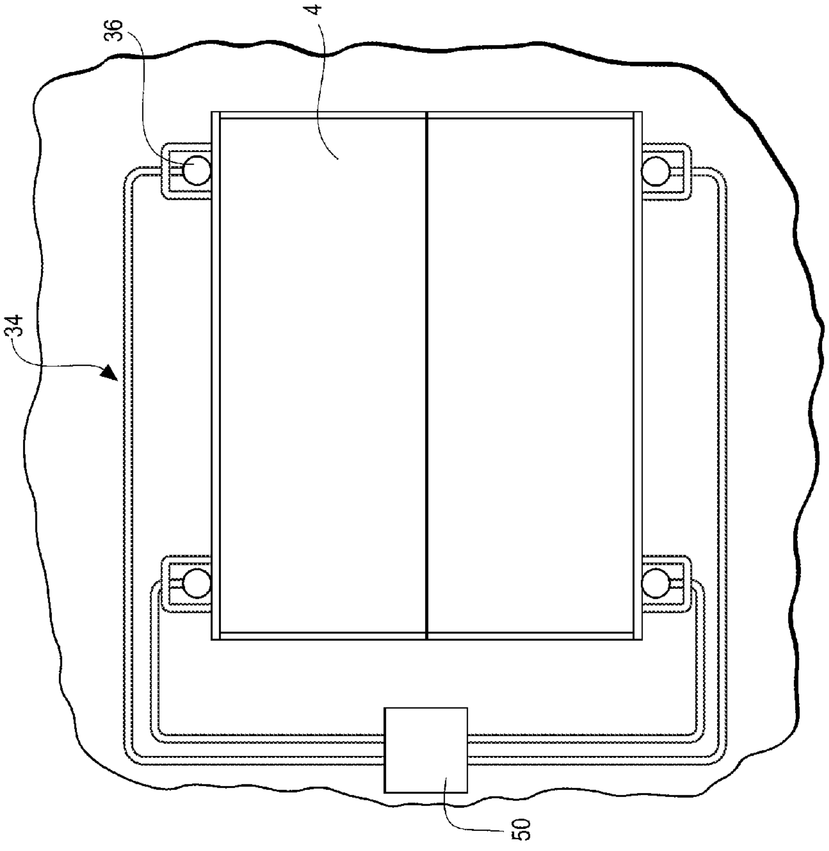
FIG. 9 illustrates a schematic top view of the connection between the self-contained hydraulic jack units and the multi-jack unit controller.

FIG. 9 illustrates a schematic top view of the connection between the self-contained hydraulic jack units 36 and the multi-jack unit controller 50. Multiple self-contained hydraulic jack units 36 are placed at various locations around a pre-fabricated enclosure 4. The depicted embodiment of the system of coordinated self-contained hydraulic jack units 34 comprises four self-contained hydraulic jack units 36. The actuable cylinder of each self-contained hydraulic jack unit 36 may be controlled by a multi-jack unit controller 50, which is located slightly away from the pre-fabricated enclosure 4. The multi jack unit controller 50 may be used to simultaneously adjust the height all of the cylinders of all of the self-contained hydraulic jack units 36. The adjustment of the cylinders causes the pre-fabricated enclosure 4 to move up or down when the self-contained hydraulic jack units 36 are connected to the enclosure.

Figure 10:
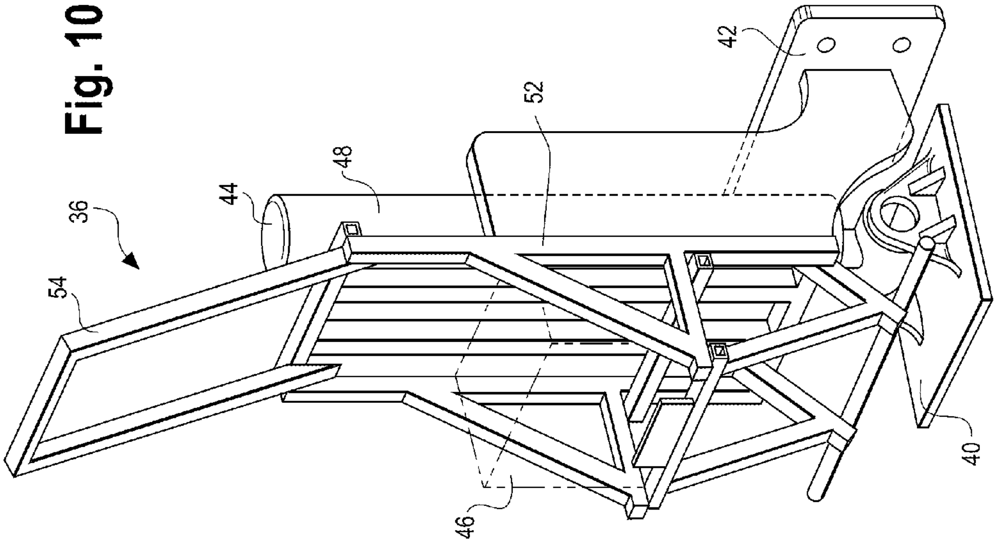
FIG. 10 illustrates an isometric view of a self-contained hydraulic jack unit.

FIG. 10 illustrates an isometric view of a self-contained hydraulic jack unit 36. The self-contained hydraulic jack unit 36 is in an upright position and is set upon its base 40. The cylinder 44, containing the counterbalanced hydraulic valve system 48, extends vertically upward from the base 40, and a supporting structure 52 is connected to the cylinder 44 and moves with the cylinder 44 when the cylinder 44 is extended or retracted. The cylinder typically has a height in the range of 16 to 22 inches. A connecting plate 42 is connected to the supporting structure 52 on one side, and a power unit 46 and wheels (not pictured) are connected on the other side. In some embodiments, the battery in the power unit 46 is a 12-volt battery. The self-contained hydraulic jack unit 36 may be moved into a tipped position by being tipped off its base 40 and onto its wheels (not pictured) when the cylinder is completely retracted. The self-contained hydraulic jack unit 36, which may weigh 300 pounds, is thus adapted to be easily transported around a job site. The top of the supporting structure 52 may comprise a handle 54 to facilitate wheeling the self-contained hydraulic jack unit 36 in its tipped position. Once the self-contained hydraulic jack units 36 are connected to the pre-fabricated enclosure, the self-contained hydraulic jack units 36 are ready for use. Once properly set, the self-contained hydraulic jack units 36 lift the pre-fabricated enclosure enough for the sliding beam system to be dismantled and removed.

Figure 11:
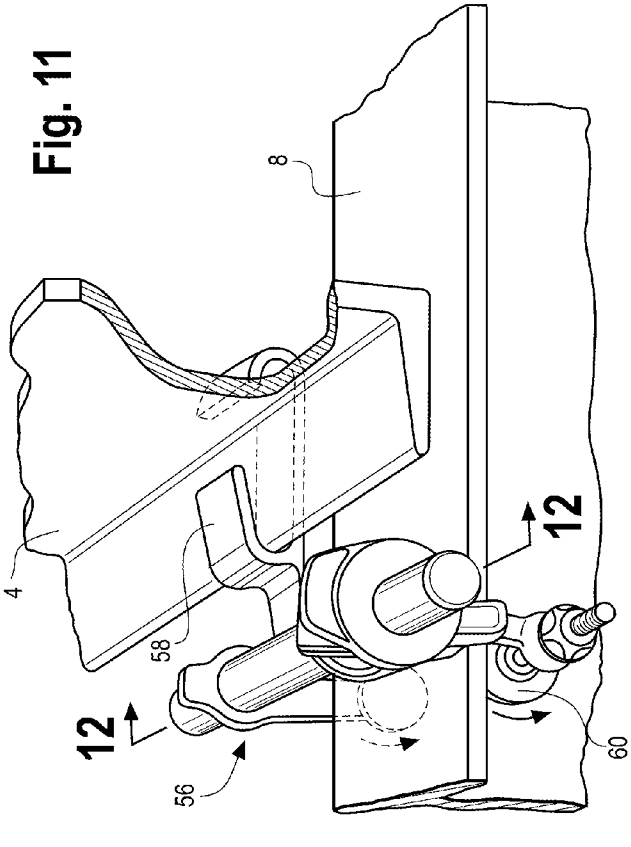
FIG. 11 illustrates an isometric view of a slide beam removal device connected to a pre-fabricated enclosure and engaged with the upper flange of a slide beam.

FIG. 11 illustrates an isometric view of a slide beam removal device 56 connected to a pre-fabricated enclosure 4 and engaged with the upper flange of a slide beam 8. The slide beam removal device 56 is attached to the pre-fabricated enclosure 4 after the pre-fabricated enclosure 4 has been positioned over the foundation and the system of coordinated self-contained hydraulic jack units has lifted the pre-fabricated enclosure slightly above the sliding beams 8. The slide beam removal device 56 comprises a securing grip 58 that attaches the slide beam removal device 56 to the C-channel of the pre-fabricated enclosure 4 and rollers 60 that engage the bottom side of the top flange of a slide beam 8. Two slide beam removal devices 56, one on either side of the pre-fabricated enclosure 4, are engaged with a single slide beam 8. The slide beam 8 may then be rolled out from underneath the pre-fabricated enclosure 4.

Figure 12:
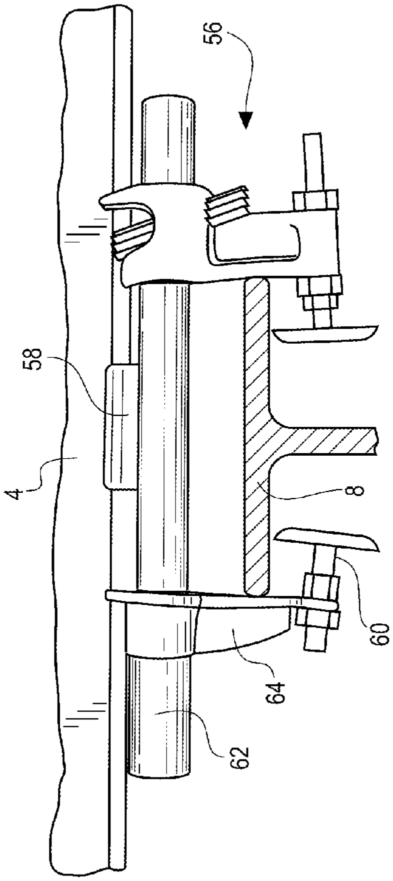
FIG. 12 illustrates an end view of a slide beam removal device connected by its securing grip to a pre-fabricated enclosure and engaged by its rollers with the upper flange of a slide beam.

FIG. 12 illustrates an end view of a slide beam removal device 56 connected by its securing grip 58 to a pre-fabricated enclosure 4 and engaged by its rollers 60 with the upper flange of a slide beam 8. In some embodiments of a slide beam removal device 56, the slide beam removal device 56 comprises a bar 62 connected to the securing grip 58. Arms 64 hang downward from the bar 62, and the rollers 60 are rotatably connected to the arms 64. The distance between the arms 64 may be adjusted and is preferably set to be equal to the width of the slide beam 8.

Figure 13:
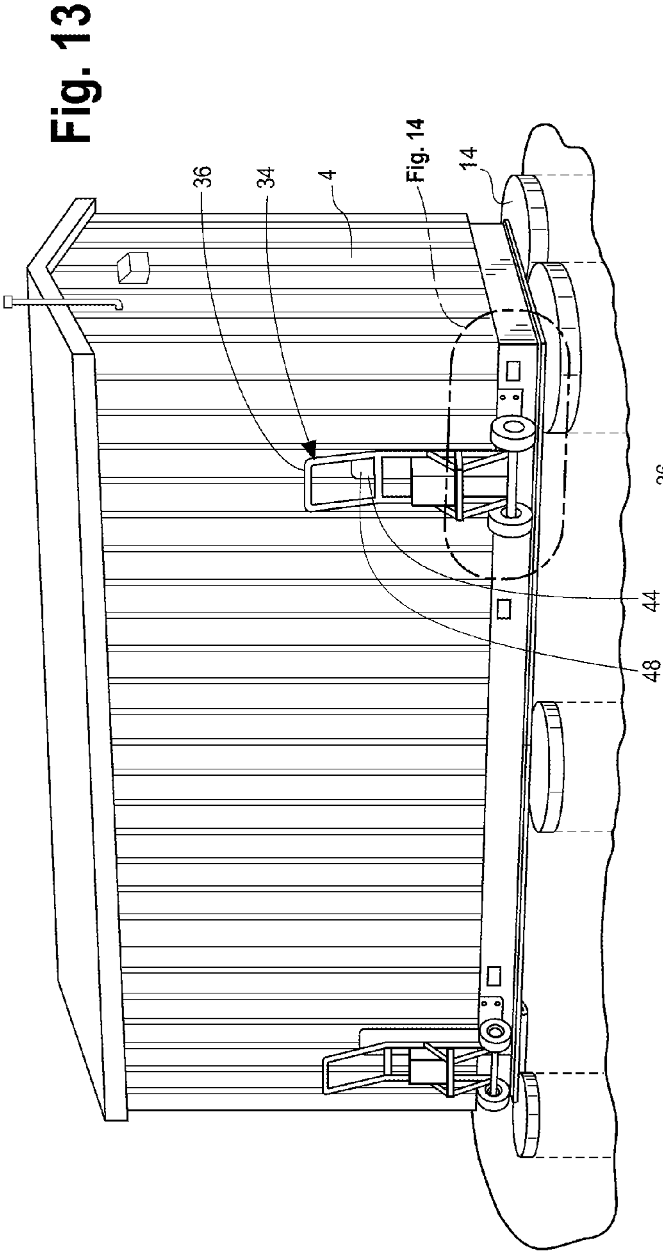
FIG. 13 illustrates the system of coordinated self-contained hydraulic jack units lowering the enclosure to the pre-laid foundation.

FIG. 13 illustrates the system of coordinated self-contained hydraulic jack units 34 lowering the pre-fabricated enclosure 4 to the pre-laid foundation 14. After the sliding beam system has been removed, the self-contained hydraulic jack units 36 may lower the pre-fabricated enclosure 4 to the pre-laid foundation 14. Advantageously, the system of coordinated self-contained hydraulic jack units 34 may partially lower the pre-fabricated enclosure 4 to the ground, and a worker may assess whether the foundation 14 is laid properly for the pre-fabricated enclosure 4 to be level. The foundation 14 may then be adjusted as necessary, with the pre-fabricated enclosure 4 moved upward and away from the foundation 14 by the system of coordinated self-contained hydraulic jack units 34 if helpful in adjusting the foundation 14, such as with shims (not shown). Ultimately, the pre-fabricated enclosure 4 is placed on the foundation 14. The counterbalanced hydraulic valve system 48 of each self-contained hydraulic jack unit prevents unwanted retraction of the cylinder 44 during these steps.

Figure 14:
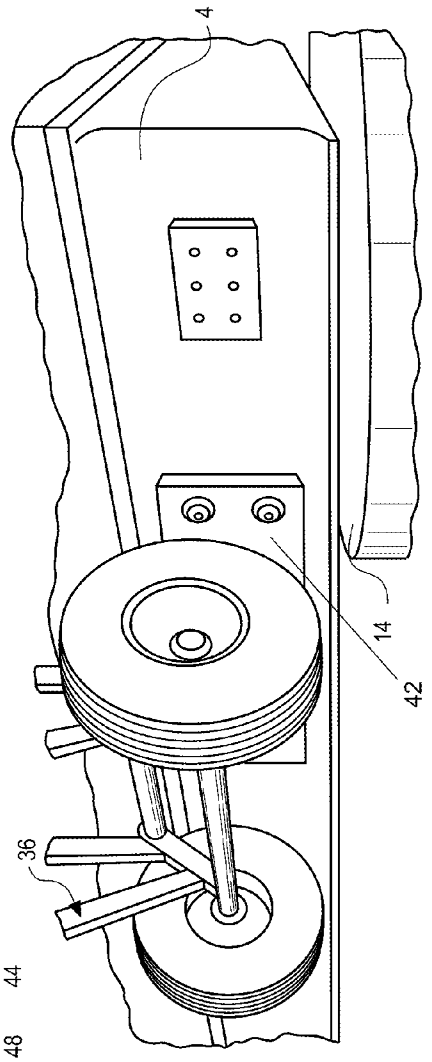
FIG. 14 illustrates the removal of the system of coordinated self-contained hydraulic jack units after the pre-fabricated enclosure has been placed on the pre-laid foundation.

FIG. 14 illustrates the removal of the system of coordinated self-contained hydraulic jack units after the pre-fabricated enclosure 4 has been placed on the pre-laid foundation 14. After placement of the pre-fabricated enclosure 4 on the pre-laid foundation 14, the connecting plate 42 may be disconnected from the pre-fabricated enclosure. Each self-contained hydraulic jack unit 36 may then be tipped from an upright position to a tipped position and wheeled away.

While various embodiments have been described, it will be understood that variations of these embodiments may be made that are considered within the scope of the appended claims.

What is claimed is:

1. A pre-fabricated enclosure transfer system, comprising:
- a sliding beam system comprising a slide beam, a cable, and a winch;
- a system of coordinated self-contained hydraulic jack units comprising a plurality of self-contained hydraulic jack units, each self-contained hydraulic jack unit comprising a pair of wheels, a base, a connecting plate, an actuable cylinder comprising a counterbalanced hydraulic valve system, and a power unit,
- wherein the sliding beam system further comprises a cable attachment plate, and
- wherein the cable attachment plate comprises a top plate, side plates, one or more hooks, and a pulley.

2. The pre-fabricated enclosure transfer system of claim 1, wherein the cable, the winch, and the pulley of the cable attachment plate are connected as a block and tackle.

3. A method of transferring a pre-fabricated enclosure, comprising:
- placing a pre-fabricated enclosure on a semi-trailer;
- attaching a system of coordinated self-contained hydraulic jack units to the pre-fabricated enclosure;
- parking the semi-trailer next to a pre-laid foundation;
- assembling a sliding beam system;
- moving the pre-fabricated enclosure from the semi-trailer on to and across the sliding beam system;
- supporting the pre-fabricated enclosure with the system of coordinated self-contained hydraulic jack units;
- removing the sliding beam system; and
- lowering the pre-fabricated enclosure to the foundation,
- wherein assembling the sliding beam system comprises:
- arranging slide beams horizontally and perpendicularly to the pre-fabricated enclosure at least every twelve feet along the length of the enclosure;
- placing a cable connection plate on top of each slide beam;
- raising the slide beams to the height of the semi-trailer;
- ensuring that the cable connection plate engages the pre-fabricated enclosure;

placing a winch at the end of each raised slide beam;

connecting each winch to each cable connection plate by a cable in a block and tackle arrangement;

connecting each winch to a generator.

4. The method of claim 3, wherein assembling the sliding beam system further comprises:

providing a lubricious surface on a top of each slide beam.

5. The method of claim 3, wherein assembling the sliding beam system further comprises positioning a blanket over each cable.

6. The method of claim 3, wherein assembling the sliding beam system further comprises placing a tongue of a slide beam on the semi-trailer.

7. A method of transferring a pre-fabricated enclosure, comprising:

placing a pre-fabricated enclosure on a semi-trailer;

attaching a system of coordinated self-contained hydraulic jack units to the pre-fabricated enclosure;

parking the semi-trailer next to a pre-laid foundation;

assembling a sliding beam system;

moving the pre-fabricated enclosure from the semi-trailer on to and across the sliding beam system;

supporting the pre-fabricated enclosure with the system of coordinated self-contained hydraulic jack units;

removing the sliding beam system; and lowering the pre-fabricated enclosure to the foundation, wherein attaching a system of coordinated self-contained hydraulic jack units to the pre-fabricated enclosure further comprises:

wheeling a plurality of self-contained hydraulic jack units in tipped positions to be adjacent to the semi-trailer;

setting a base of each self-contained hydraulic jack unit on the ground or on a block and righting each self-contained hydraulic jack unit into an upright position;

extending a cylinder of each self-contained hydraulic jack unit until a connecting plate of each self-contained hydraulic jack unit is at the same height as the pre-fabricated enclosure;

fastening the connecting plate of each self-contained hydraulic jack unit to the pre-fabricated enclosure, wherein fastening the connecting plate of each self-contained hydraulic jack unit to the pre-fabricated enclosure includes bolting the connecting plate to a vertical web of an C-channel of a frame defining a base of the pre-fabricated enclosure.

8. A method of transferring a pre-fabricated enclosure, comprising:

placing a pre-fabricated enclosure on a semi-trailer;

attaching a system of coordinated self-contained hydraulic jack units to the pre-fabricated enclosure;

parking the semi-trailer next to a pre-laid foundation;

assembling a sliding beam system;

moving the pre-fabricated enclosure from the semi-trailer on to and across the sliding beam system;

supporting the pre-fabricated enclosure with the system of coordinated self-contained hydraulic jack units;

removing the sliding beam system; and lowering the pre-fabricated enclosure to the foundation, wherein moving the pre-fabricated enclosure from the semi-trailer on to the sliding beam system further comprises:

turning on a generator connected to one or more winches;

employing block and tackle arrangements of the winches, cables, and cable connection plates connected to the pre-fabricated enclosure to pull the pre-fabricated enclosure off the semi-trailer toward ends of a plurality of slide beams by rotating the winches;

stopping pulling the pre-fabricated enclosure when the pre-fabricated enclosure is positioned above the foundation.

9. A method of transferring a pre-fabricated enclosure, comprising:

placing a pre-fabricated enclosure on a semi-trailer;

attaching a system of coordinated self-contained hydraulic jack units to the pre-fabricated enclosure;

parking the semi-trailer next to a pre-laid foundation;

assembling a sliding beam system;

moving the pre-fabricated enclosure from the semi-trailer on to and across the sliding beam system;

supporting the pre-fabricated enclosure with the system of coordinated self-contained hydraulic jack units;

removing the sliding beam system; and lowering the pre-fabricated enclosure to the foundation, wherein removing the sliding beam system further comprises:

securing a supporting grip of a slide beam removal device to the pre-fabricated enclosure;

engaging rollers of the slide beam removal device with a slide beam of the sliding beam system;

rolling the slide beam out from underneath the pre-fabricated enclosure.

* * * * *